United States Patent [19]
Trubiano

[11] 3,885,806
[45] May 27, 1975

[54] NESTABLE STROLLER
[75] Inventor: Antoine Trubiano, Montreal East, Quebec, Canada
[73] Assignee: Cari-All Inc., Montreal East, Quebec, Canada
[22] Filed: June 17, 1974
[21] Appl. No.: 480,158

[52] U.S. Cl............................ 280/33.99 B; 280/36 B
[51] Int. Cl............................ B62b 7/00; B62b 11/00
[58] Field of Search 280/33.99 B, 33.99 H, 33.99 S, 280/33.99 C, 33.99 A, 33.99 R, 36 B, 41 A

[56] References Cited
UNITED STATES PATENTS

| | | | |
|---|---|---|---|
| 2,662,775 | 12/1953 | Goldman | 280/33.99 B |
| 2,769,645 | 11/1956 | Young | 280/33.99 B |
| 3,057,635 | 10/1962 | Cibrowski | 280/33.99 B |
| 3,174,768 | 3/1965 | Sanders et al. | 280/33.99 C |
| 3,337,227 | 8/1967 | Castaldo | 280/33.99 H |
| 3,497,234 | 2/1970 | Schray | 280/33.99 B |

*Primary Examiner*—David Schonberg
*Assistant Examiner*—David M. Mitchell
*Attorney, Agent, or Firm*—Alan Swabey; Robert E. Mitchell

[57] ABSTRACT

The invention relates to a nestable stroller construction which is sturdy and which can be nested into a relatively small storage space. The stroller consists of a frame supported on wheels and including a U-shaped horizontally disposed shelf support member, the legs of the U tapering inwardly toward the front of the stroller. Upright members extend upwardly from each leg of the U, the upright members consisting of a forwardly extending portion connected to the leg, a central portion, and a rearwardly extending handle portion extending upwardly from the central portion. Forwardly extending seat support members extend from the central portion of each of the upright members, and seat means are disposed between and supported by the seat support members. The seat means includes a seat portion, leg receiving openings, and a back support. The seat can be either collapsible or rigid.

3 Claims, 3 Drawing Figures

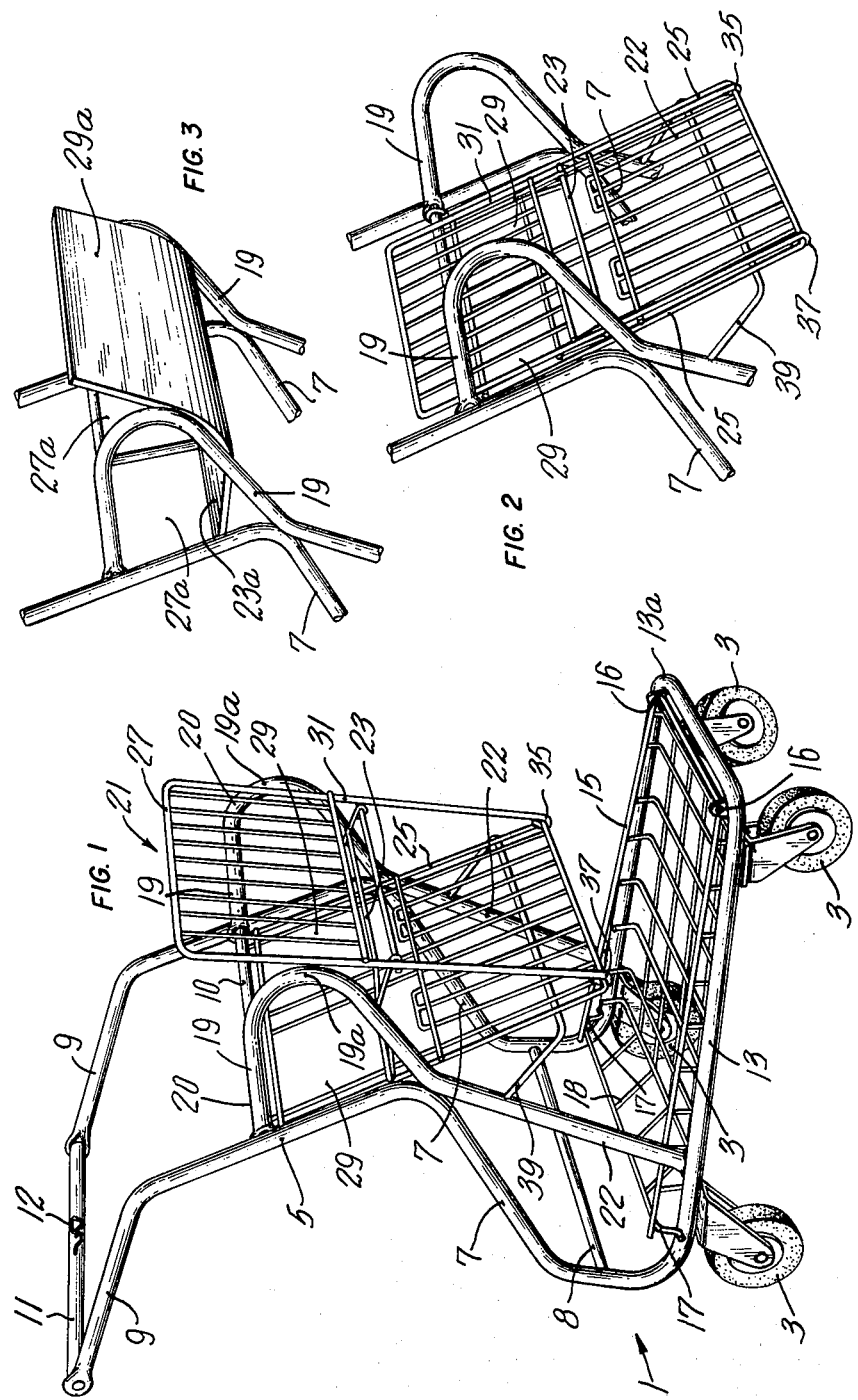

NESTABLE STROLLER

BACKGROUND OF THE INVENTION

1. Field of the Invention

This invention relates to a nestable stroller. More specifically, this invention relates to a nestable stroller which is especially useful in a shopping center environment.

2. Statement of the Prior Art

Strollers for infants are, of course, well known in the art. However, most strollers are not made for commercial use and are therefore of relatively flimsy construction. It is also known to make nestable carts for various uses as is shown in U.S. Pat. Nos. 2,882,062, Hoedinghaus et al and 3,174,768, Sanders et al. However, neither of these carts have facilities for seating an infant.

U.S. Pat. No. 3,497,234, Schray, teaches a nestable stroller for use in a shopping center. Although this stroller appears to be of a relatively sturdy construction, it has the disadvantage of requiring a collapsible seat for nesting. In addition, a child is seated facing the front and away from parental authority so that the child can reach out and pull articles off shelves. Further, it provides a rather elongated vertical shelf and does not, and cannot, accommodate a bottom shelf.

SUMMARY OF THE INVENTION

The instant invention can accommodate either a collapsible or a rigid seat. In addition, in the nestable stroller in accordance with the invention, a child is seated facing the parent and at a level so as to be virtually face to face with the parent. The stroller of the invention also provides a bottom shelf with a relatively large floor area for placing parcels, and a plurality of such strollers can be stored in a relatively small area.

In accordance with the invention a nestable stroller construction comprises; a frame member supported on wheel means; said frame member comprising a horizontally disposed U-shaped shelf support member at the bottom of said stroller, the closed part of the U-shaped member being at the front end of said stroller and comprising the front end of said U-shaped member, the legs of said U of said U-shaped member sloping outwardly away from each other from the front end to the back end of said U-shaped member; upright members extending upwardly from each leg of the U at the back end of said U-shaped member, each said upright member comprising a forwardly extending bottom portion connected, at the bottom ends thereof, to their respective legs of said U and extending upwardly and forwardly from the respective leg, a central portion, extending upwardly from said forwardly extending bottom portion, and a rearwardly extending handle portion extending upwardly and rearwardly from said central portion and terminating in a free end; the free ends of said handle portions being joined by handle means; forwardly extending seat support members extending from the central portion of each upright member; and seat means including leg receiving openings disposed between said upright members, a seating portion disposed between said seat support members and said leg receiving openings, and back support means extending from said seating portion.

BRIEF DESCRIPTION OF THE DRAWINGS

The invention will be better understood by an examination of the following description with the aid of the accompanying drawings in which:

FIG. 1 is a perspective view of the inventive nestable stroller;

FIG. 2 shows the collapsible seat in its collapsed postion; and

FIG. 3 shows a rigid seat which can be used with the inventive stroller.

DETAILED DESCRIPTION OF THE DRAWINGS

Referring now to the drawings, the nestable stroller comprises an integrated frame 1 which is carried on four wheels 3. The frame comprises an upright member 5 which includes forwardly extending bottom portions 7, separated by spacer bar 8, and rearwardly extending handle portions 9 separated by spacer bar 10, and an upwardly extending central portion between 7 and 9. The stroller also includes a handle 11, joining the free ends of the handle portions 9, which can include hook means 12 for hanging bags or other articles. The hook means are described in applicant's copending application Ser. No. 452,114 filed Mar. 18, 1974.

The forwardly extending bottom portions 7 are integrally connected to U-shaped shelf supporting member 13, which supports bottom pivotable shelf 15. The shelf 15 is pivotable about the pins 16, and is supported at its free end on the member 13 by rests 17. It can be seen that the free end can be pivoted up and away from the member 13. The shelf also includes an upwardly sloped rear portion 18.

Attached to and extending from the central portions of the upright members 5 are forwardly extending seat support members 19. These comprise semi-circular portion 20, both ends of which are connected to the central portion of the upright member, and downwardly extending portion 22, connected at its free ends to member 13. The seat support members can also provide arm supports for a seated child. The seat support members further provide structural support for the seat 21 which includes a seat portion 23, a front panel 25, and a back support 27. The front panel, which is disposed between the upright members, has openings 29 for receiving the legs of a seated infant, and the back support is made up of rods 31 and 33 jointed together by a horizontal bar. The seat is of a well know construction, and is collapsible as shown in FIG. 2. The back support is pivotable relative to the front panel about the points 35 and 37, and the seat portion is pivotable on the front panel and contains a free end adjacent to the back support.

The front panel is held in position by support member 39 which extends from the bottom half of forwardly extending member 19.

Although a collapsible seat is illustrated in FIGS. 1 and 2, the inventive stroller can just as easily accommodate a rigid seat as illustrated in FIG. 3. The seat in FIG. 3 consists of seat portion 23a, back support 29a and leg receiving openings 27a. The seat is again supported by seat support members 19. The rigid seat of FIG. 3 can be made of either a metal or a plastic material as is well known in the art.

To nest the strollers, one into another, the front end 13a of the U-shaped member 13 of a rear stroller is pushed into the opening of the U of the U-shaped member 13 of a front stroller. The front of the shelf 17 of the rear stroller will engage the upwardly sloped portion 18 of a front stroller and cause it to pivot upwardly away from the U-shaped member 13. As the front end of the rear stroller is narrower than the back end of the first stroller, the shelf of the rear stroller will slide in under the shelf of the front stroller, and the U-shaped member of the rear stroller will be contained within the U-shaped member of the front stroller.

The rear stroller will be pushed in until the front portions 19a of the forwardly extending members 19 abut adjacent portions of upright members 5. The legs of the U-shaped members 13 are inwardly sloped in the forward direction with a slope sufficient to permit this. As is obvious, the seat does not have to collapse when the strollers are in the nested position so that the stroller, in accordance with the invention, can accommodate a rigid seat without losing its nesting facility. In addition, the frame and forwardly extending members are preferably made of a sturdy tubular material so that the entire construction is sturdy and usable as a rented item in, for example, shopping centers, without suffering fatal damages from the abuse given such rented items.

Also, in accordance with the invention, the child is seated to face the pusher of the stroller and at virtually a face to face level with the pusher. Further, the shelf 15 can contain side walls as shown in FIG. 1, or higher side walls than illustrated, especially with the rigid seat construction, and this shelf can be well utilized for carrying parcels or the like.

Although only two embodiments have been described above, this was for the purpose of illustrating, but not limiting, the invention. Various modifications, which will come readily to the mind of one skilled in the art, are within the scope of the invention as defined in the appended claims.

I claim:
1. A nestable stroller construction comprising;
a frame member supported on wheel means for permitting movement of the stroller;
said frame member comprising a horizontally disposed U-shaped shelf support member at the bottom of said stroller, the closed part of the U-shaped member being at the front end of said stroller and comprising the front end of said U-shaped member, the legs of said U of said U-shaped member sloping outwardly away from each other from the front end to the back end of said U-shaped member;
upright members extending upwardly from each leg of the U at the back end of said U-shaped member, each said upright member comprising a forwardly extending bottom portion connected, at the bottom ends thereof, to their respective legs of said U and extending upwardly and forwardly from the respective leg, a central portion, extending upwardly from said forwardly extending bottom portion, and a rearwardly extending handle portion extending upwardly and rearwardly from said central portion and terminating in a free end;
the free ends of said handle portions being joined by a handle;
forwardly extending seat support members comprising a semi-circular like portion having upper and lower arcuate sections, and a downwardly extending portion extending from the said lower arcuate section adjacent the said central portion of the upright members to a connection with a leg of said U-shaped frame member; and
seat means suspended from said seat support members for holding a child including a leg receiving portion disposed between said upright members at the central portion thereof, a seating portion extending forwardly from said leg receiving portion and extending substantially horizontally between said lower arcuate sections of said seat support members, back support means extending upwardly from the forward end of said seating portion, and arm support portions formed by said upper arcuate sections of the seat support members.

2. A nestable stroller construction as defined in claim 1 wherein said upright members and said U-shaped member are integrally connected to form an integral frame member.

3. A nestable stroller construction as defined in claim 1 wherein a shelf unit is supported on said U-shaped member, said shelf unit being pivotable relative to said U-shaped member about pivot pins at the front end of said U-shaped member.

* * * * *